United States Patent [19]
Okuyama et al.

[11] Patent Number: 4,747,904
[45] Date of Patent: May 31, 1988

[54] CYLINDRICAL TIRE FORMING MEMBER MANUFACTURING APPARATUS

[75] Inventors: Kouji Okuyama; Makoto Yamamoto; Hidetoshi Kimura; Taizo Ito, all of Tokyo, Japan

[73] Assignee: Bridgestone Corporation, Tokyo, Japan

[21] Appl. No.: 35,535

[22] Filed: Apr. 7, 1987

[30] Foreign Application Priority Data

Apr. 7, 1986 [JP] Japan .................................. 61-79863

[51] Int. Cl.$^4$ ............................................. B29D 30/18
[52] U.S. Cl. ..................................... 156/403; 156/408; 156/410; 156/413; 156/415; 156/422
[58] Field of Search ...................... 156/126, 127, 128.1, 156/128.6, 129, 130, 130.3, 130.7, 133–136, 398–403, 408–422

[56] References Cited

U.S. PATENT DOCUMENTS

| | | | |
|---|---|---|---|
| 3,867,231 | 2/1975 | Casey | 156/398 X |
| 3,883,387 | 5/1975 | Csatlos | 156/401 X |
| 4,007,081 | 2/1977 | Mallory | 156/407 |
| 4,105,487 | 8/1978 | Suzuki et al. | 156/126 X |
| 4,128,450 | 12/1978 | Cantorutti | 156/417 |
| 4,314,864 | 2/1982 | Loeffler et al. | 156/126 X |
| 4,430,143 | 2/1984 | Aihara | 156/403 |
| 4,470,867 | 9/1984 | Caretta et al. | 156/401 X |
| 4,473,427 | 9/1984 | Irie | 156/419 X |
| 4,581,084 | 4/1986 | Mukae et al. | 156/403 X |
| 4,627,884 | 12/1986 | Araki | 156/403 X |

*Primary Examiner*—Tom Wyse
*Attorney, Agent, or Firm*—Sughrue, Mion, Zinn, Macpeak, and Seas

[57] ABSTRACT

In a cylindrical tire forming member building method or apparatus, after the front end portion of a belt-shaped material is pressed against the drum, the belt-shaped material is wound on the drum while being centered, and with the central portion of the rear end portion of the belt-shaped material pressed against the drum with a robot hand, both edge portions of the rear end portion of the belt-shaped material are elongated longitudinally and pressed against the drum with the robot hand, so tha front and rear ends of the belt-shaped material are butt-joined without forming a gap therebetween or without being overlapped.

8 Claims, 3 Drawing Sheets

CYLINDRICAL TIRE FORMING MEMBER MANUFACTURING APPARATUS

BACKGROUND OF THE INVENTION

1. Field of the Invention

This invention relates to both a method and an apparatus for building a forming structure of a cylindrical tire by winding a belt-shaped material on a drum.

2. Background of the Invention

In a tire building industry, a radial tire is built, for instance, as follows. A tread band with belt built cylindrically in advance on another building drum is set on the cylindrical carcass built on a tire building drum. Then, the cylindrical carcass is shaped to be toroidal and the belt tread band and the carcass are joined. In general, such a tread band is built by winding a belt-shaped tread rubber material on the building drum. However, the belt-shaped tread rubber material is disadvantageous in that, since both edge portions, in their widthwise direction, are smaller in thickness than the middle, the edge portions contract longitudinally. This side shrinkage causes a phenomena called "short-side" with the result that the front and rear ends of the tread rubber material are not positively butt-joined.

One example of a conventional building method or apparatus of cylindrical tire-building member has been disclosed, for instance, by Japanese Published Patent Application (OPI) No. 42445/1983. The apparatus includes a chuck mechanism for clamping both edge portions of a rubber sheet. An air cylinder moves the chuck mechanism towards a forming drum. A brake mechanism holds the rear end portion of the rubber sheet and slightly elongates the two edge portions of the rubber sheet in cooperation with the chuck mechanism. Finally, a depressing mechanism presses the front end portion of the rubber sheet against the drum. In the apparatus after the two edge portions of the front end portion of the rubber sheet have been clamped by the chuck mechanism, the chuck mechanism is moved towards the drum by the air cylinder. In this operation, while the chuck mechanism moves a predetermined distance, the brake mechanism holds the rear end portion of the rubber sheet to slightly elongate the two edge portions of the rubber sheet to slightly elongate the "short-side". Thereafter, the front end of the rubber sheet is moved to a predetermined position above the drum by the chuck mechanism and is then pressed against the drum by the depressing mechanism. Under this condition, the chuck mechanism is moved away from the rubber sheet. While the rubber sheet is being fed, the drum is rotated, to form the cylindrical tire forming member.

In the above-described apparatus or method, while the rear end of the rubber sheet is being held by the brake system, the chuck mechanism holding the two edge portions of the front end portion of the rubber sheet is moved so that the two edge portions of the rubber sheet are slightly elongated. Therefore, in this operation, the central portion in the widthwise direction, of the rubber sheet is also somewhat elongated. As a result, the front and rear ends of the rubber sheet may be not satisfactorily butt-joined. Furthermore, in the conventional apparatus or method, after the front end of the rubber sheet has been pressed against the drum, the chuck mechanism is moved away from the rubber sheet without maintaining the two edge portions of the rubber sheet elongated. Therefore, the two edge portions of the rubber sheet are partially elastically deformed, i.e., contracted, thus causing the unsatisfactory joint.

SUMMARY OF THE INVENTION

Accordingly, an object of this invention is to eliminate the above-described difficulties accompanying building method and apparatus of conventional cylindrical tire building member.

The foregoing object and other objects of the invention have been achieved by the provision of a method of manufacturing a cylindrical tire building member in which, according to the invention, after the front end portion of a belt-shaped material is conveyed to a building drum and pressed against the drum while being held, the belt-shaped material, while being centered, is wound on the drum which is rotating. After the central portion, with respect to the widthwise direction, of the rear end portion of the belt-shaped material is pressed against the drum with a robot hand, both edge portions, in the widthwise direction, of the rear end portion of the belt-shaped material are longitudinally elongated and pressed against the drum with the above-mentioned robot hand. The front and rear ends of the belt-shaped material are then butt-joined. Second, according to another aspect of the invention, after the front end portion of a belt-shaped material is conveyed to a building drum while being held, the widthwise center of the front end of the belt-shaped pressed against the drum with a robot hand. Both widthwise edge portions of the front end of the belt-shaped material are longitudinally elongated and pressed against the drum with the robot hand. The belt-shaped material, while being centered, is wound on the drum which is rotating. The front and rear ends of the belt-shaped material are butt-joined.

Thirdly, the apparatus for practicing the method of the invention includes a pair of lower pawls which are moved towards or away from each other coupled to a robot hand body which is movable at least in a plane perpendicular to the axis of a forming drum. A pair of upper pawls are coupled to the robot hand body in such a manner that the upper pawls are paired with the respective lower pawls. The upper pawls are movable towards or away from the lower pawls to clamp, together with the upper pawls, both edge portions, in the widthwise direction of a belt-shaped material. Rocking means rock the upper and lower pawls thus paired as units in the plane. A depressing member is coupled to the robot hand body in such a manner so that the depressing member is positioned between the pair of upper pawls so that the depressing member is movable in the direction of thickness of the belt-shaped material.

In the apparatus or method of the invention, first the belt-shaped material is wound on the rotating drum as much as a predetermined length, the depressing member is moved in the direction of thickness of the belt-shaped material to press the widthwise central portion of the rear end portion of the belt-shaped material against the drum. Thereafter, the upper pawls are moved towards the lower pawls so that the two edge portions of the rear end portion of the belt-shaped material are clamped by the upper and lower pawls. Under this condition, the rocking means are operated to cause the upper and lower pawls to elongate the two edge portions to eliminate the "short-side". Thereafter, the upper and lower pawls are moved downwardly so that the belt-shaped material is pushed against the drum only by the upper pawls. Then, the lower pawls are moved away from each other; that is, they are disengaged from the belt-shaped material. In succession with this, the two edge portion elongated are pressed against the drum by the upper pawls. In eliminating the "short-side", the widthwise central portion of the belt-shaped material is pushed against the drum in this manner, and therefore only the two edge portions can be elongated. Since the two edge portions thus elongated are pressed against the drum with the upper pawls, they will not contract while being pressed. In this manner, the front and rear ends of the belt-shaped material are butt-joined to build the aimed cylindrical tire building member.

According to another aspect of the invention, the "short-side" can be eliminated by elongating the two edge portions of the front end portion of the belt-shaped material before the latter is wound on the drum.

The nature, principle and utility of the invention will become more apparent from the following detailed description when read in conjunction with the accompanying drawings in which like parts are designated by like reference numerals.

DETAILED DESCRIPTION OF THE INVENTION

One preferred embodiment of this invention will be described with reference to the accompanying drawings.

Figure 1:
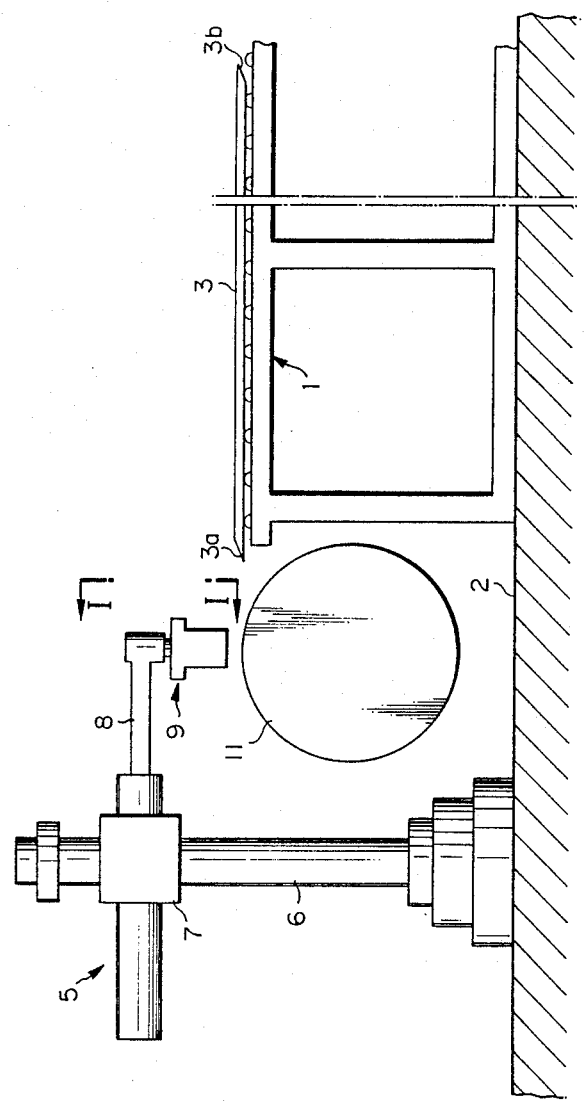
FIG. 1 is a front view showing the arrangement of one example of an apparatus for manufacturing a cylindrical tire building member according to this invention.

As shown in FIG. 1, a conveying mechanism 1 made up of a roller conveyor is installed on a floor 2. The conveying mechanism 1 conveys a belt-shaped material 3 such as a tread rubber material having a predetermined length. The conveying mechanism 1 may be made up of a belt conveyor. That is, all that is required for the conveying mechanism 1 is to smoothly convey the belt-shaped material 3 when it is taken up, or to forcibly feed the belt-shaped material 3 at a speed equal to the take-up speed. The belt-shaped material 3 may be a much longer one. However, in this case, the belt-shaped material 3 should be cut to the predetermined length with a cutter when it is conveyed a certain distance.

A robot 5 is disposed in front of the conveying mechanism. The robot 5 has a vertical post 6, a body 7 vertically movably supported on the post 6, and an arm 8 which is supported by the body 7 in such a manner that it is movable in a horizontal direction. A hand 9 for handling the belt-shaped material 3 is coupled to the end of the arm 8. A building drum 11, the amount of rotation and the speed of rotation of which can be controlled, is disposed between the conveying mechanism 1 and the robot 5. The rotary axis of the drum 11 is perpendicular to the direction of movement of the arm 8 and is held horizontal. Therefore, the hand 9 can two-dimensionally move in a plane perpendicular to the rotary axis of the drum 11. The robot 5 may be so designed as to be able to move in a transverse horizontal direction as to rotate horizontally so that the hand 9 can move three-dimensionally.

Figure 2:
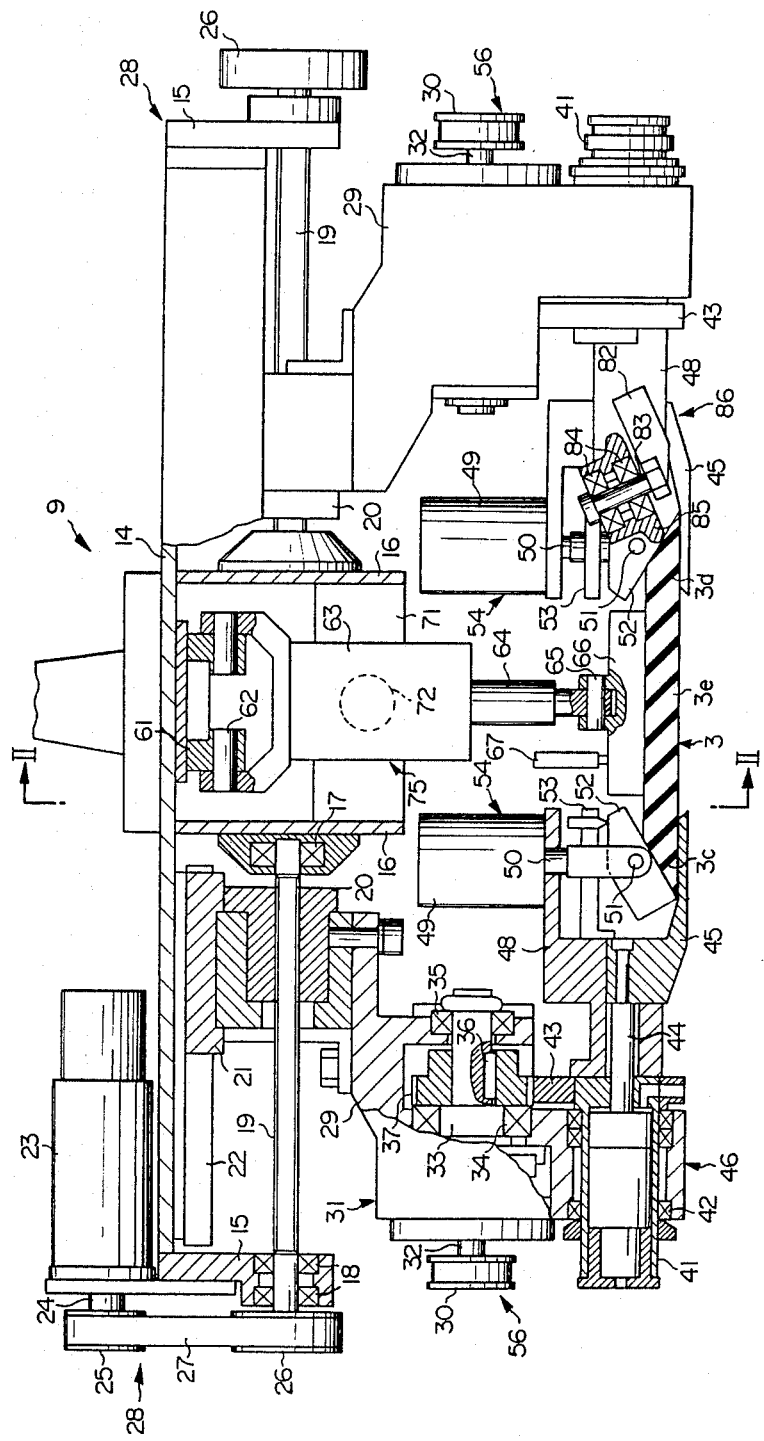
FIG. 2 is a diagram, with parts cut away, as viewed in the direction of arrow line II—II in FIG. 1.
Figure 3:
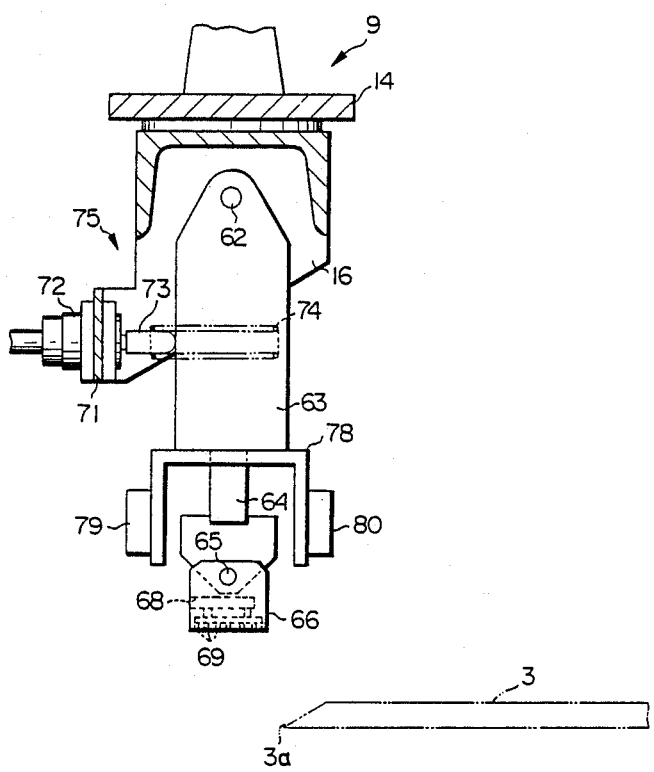
FIG. 3 is a diagram taken in the direction of arrow line III—III in FIG. 2.

As shown in FIGS. 2 and 3, the hand 9 has a hand body 14 extending horizontally. Auxiliary plates 15 are fixed to both lateral ends of the hand body 14. A pair of vertical central plates 16 are fixed to the central portion of the hand body 14. The auxiliary plates 15 have respective bearings 18 and the central plates 16 also have respective bearings 17. A pair of threaded shafts 19 which are threaded in opposite direction are rotatably supported by the bearings 17 and 18 in such a manner that the threaded shafts 19 are held horizontal. The threaded shafts 19 are engaged with threaded blocks 20, to which guide blocks 21 are fixed. The guide blocks 21 are slidably engaged with a pair of rails 22 which are fixedly secured to the lower surface of the hand body 14 in such a manner that the rails are in parallel with the threaded shafts 19.

Electric motors 23 are mounted on both end portions of the hand body 14. In each of the electric motors 23, a pulley 25 is fixedly mounted on the output shaft 24 and a timing belt 27 is laid over the pulley 25 and a pulley 26 fixedly mounted on the threaded shaft 19. Therefore, as the motors 23 operate, the threaded blocks 20 are equidistantly displaced while moving towards or away from each other. The threaded shafts 19, the threaded blocks 20, the guide blocks 21, the rails 22, the motors 23, the pulleys 25 and 26, and the timing belts 27 form first moving means 28. The two moving means 28 operate respectively to move the upper and lower pawls on the right-hand side (described later) towards or away from each other and to move the upper and lower pawls on the left-hand side (described later) towards or away from each other. The first moving means 28 also operate to move two pairs of pawls towards or away from each other.

A movable unit 29 is fixedly secured to each of the threaded blocks 20. A speed reducing device 31 is built into each of the movable units 29. A pulley 30 fixedly mounted on the input shaft 32 of each of the movable units 29 is coupled to an electric motor (not shown). The output shaft 33 of each of the speed reducing devices 31 is rotatably supported through bearings 34 and 35 in the movable unit 29. A low-speed output gear 37 is fixedly mounted on the output shaft 33 with a key 36.

Below the speed reducing devices 31, two cylinders 41 substantially in parallel with the threaded shafts 19 are rotatably supported through bearings 42 by the respective movable units 29. A gear member 43 is fixedly provided on the side of a piston rod 44 of each of the cylinders 41. About one-third ($\frac{1}{3}$) of the periphery of each of the gear member 43 which confronts with the low-speed output gear 37 is formed into teeth which are engaged with the low-speed output gear 37. The aforementioned lower pawls 45 are respectively fixed to the end portions of the piston rods 44 of the cylinders 41. These pawls 45 are so designed as to engage with the lower surfaces of both respective edge portions 3c and 3d (as viewed in the widthwise direction) of the belt-shaped material 3. As the piston rods 44 of the cylinders 41 are moved in and out, the lower pawls 45 are moved away and towards each other in the widthwise direction of the belt-shaped material 3. The cylinders 41, and the piston rods 44 form two second moving means 46 for moving the respective lower pawls 45 towards or away from each other.

Rocking blocks 48 are fixed to the respective cylinders 41 on the sides of the piston 44 rods. Vertical cylinders 49 are fixed to the respective rocking blocks 48. The aforementioned upper pawls 52, which are paired with the lower pawls 45, are rotatably coupled to the end portions of piston rods 50 of the respective vertical cylinders 49 with pins 51. The upper pawls 52 are moved towards or away from the lower pawls 45 by the vertical cylinders 49 so as to clamp the respective portions 3c and 3d of the belt-shaped material 3. The upper pawls 52 are larger in width than the lower pawls 45. Stoppers 53 are fixedly secured to the vertical piston rods 50 to prevent excessive rotation of the upper pawls 52. The vertical cylinders 49, the piston rods 50 and the stoppers 53 form pawl opening and closing means for moving the upper pawls towards or away from the lower pawls to thereby open or close the pawls.

The motors (not shown), the speed reducing devices 31, the low-speed output gears 37, the gear members 43 and the rocking blocks 48 form respective rocking means 56 for rocking the upper and lower pawls 52 and 45 as respective units about the axes of the horizontal cylinders 41 in the planes perpendicular to the rotary axis of the building drum 11.

A pair of brackets 61 are fixedly secured to the central part of the hand body 14 between the central plates 16. The head portion of a vertical cylinder 63 is supported by the brackets 61 through pins 62 in such a manner that the cylinder 63 is swingable. A depressing member 66 is swingably coupled through a pin 65 to the end portion of a piston rod 64 of the vertical cylinder 63. A passageway 68 is formed in the depressing member 66 and communicates through a pipe 67 to a vacuum source. A number of openings 69 are formed in the lower face of the depressing member 66 and communicate with the passageway 68. Therefore, the depressing member 66 can be positioned between the upper pawls and can hold the central portion 3e (as viewed in the widthwise direction of the belt-shaped material 3) of the belt-shaped material 3. As the piston rod 64 of the vertical cylinder 63 is pushed out, the depressing member 66 is moved in the direction of the thickness of the belt-shaped material 3 to push the central portion of 3e of the material 3 against the building drum 11.

A pin cylinder 72 with a piston rod 73 aligned with the longitudinal direction of the belt-shaped material 3 is fixed to a connecting plate 71 through which the pair of central plates 16 are connected. Springs 74 connected to the other vertical cylinder 63 and the central plates 16 urge the vertical cylinder 63 towards the pin cylinder 72. When the piston rod 73 of the pin cylinder 72 is pushed out, the vertical cylinder 63 is swung about the pins 62 toward the side of the conveying mechanism 1 against the springs 74. The cylinder 63, the pin cylinder 72, and the springs 74 form depressing means 75 for moving the depressing member 66 towards the drum 1 thereby to push the central portion 3e of the belt-shaped material 3 against the drum.

A bracket 78 is fixed to the lower end of the vertical cylinder 63. A front end sensor 79 for detecting the front end 3a of the belt-shaped material 3 is installed on the front end of the bracket 78 which is closer to the robot 5 than the depressing member 66. A rear end sensor 80 for detecting the rear end 3b of the belt-shaped material 3 is installed on the rear end of the bracket 78 which is closer to the conveying mechanism 1 than the depressing member 66. The detecting operations of these sensors 79 and 80 are carried out at the center (in the widthwise direction) of the belt-shaped material 3.

Shafts 83 are fixed through brackets 82 to each of the aforementioned rocking blocks 48. Centering rollers 85 are rotatably mounted through bearings 84 on the respective shafts 83. These centering rollers 85 are brought into rolling contact with both edge portions 3c and 3d of the belt-shaped material 3, to center the belt-shaped material 3 during its conveyance. The brackets 82, the shafts 83, the bearing 84 and the centering rollers 85 form centering means 86 for centering the belt shaped means 86.

Now, the operation of the apparatus thus constructed will be described.

First, the belt-shaped material 3 is conveyed until its front end 3a reaches a predetermined position near the drum 11. Under this condition, the robot 5 is operated so that the hand 9 is moved towards the front end 3a of the belt-shaped material 3. The movement of the arm 9 is stopped when the front end 3a is detected by the front end sensor 79. At this time instant, the threaded blocks 20 are moved away from each other over the maximum distance, and the distance between the tips of the lower pawls 45 is larger than the width of the belt-shaped material 3 and the upper pawls 52 and the depressing member 66 are maintained in a raised position. Next, the hand 9 is moved downwardly until the belt-shaped material 3 is positioned between the upper pawls 52 and the lower pawls 45 and then the motors 23 are operated to rotate the thread shafts 19. As a result, the thread block 20, the lower pawls 45 and the upper pawls 52 on the right-hand side and those on the left-hand side are moved, as units, towards each other so that the lower pawls 45 are placed under the belt-shaped material 3 by a predetermined length. Under this condition, the hand 9 is moved upwardly until the lower pawls 45 are brought into contact with the lower surface of the belt-shaped material 3 and then the piston rods 50 of the cylinders 49 are pushed out to move the upper pawls 52 downwardly. As a result, the two edge portions 3c and 3d of the front end portion of the belt-shaped material 3 are clamped by the two pairs of upper and lower pawls 52 and 45, as shown by the left-hand upper pawl in FIG. 2.

Thereafter, the piston rod 64 of the vertical cylinder 63 is pushed out, so that the depressing member 66 is abutted against the upper surface of the central portion of the belt-shaped material 3 and the central portion is sucked and retained by the depressing member 66 through the sucking force of its openings 69. Under this condition, the hand 9 is moved to a predetermined position near the top of the drum 11 to move the front end 3a of the belt-shaped material 3 to the drum 11. In this operation, the belt-shaped material 3 is pulled out of the conveying mechanism 1. In the case where the conveying mechanism 1 is a belt conveyor, the belt conveyor is run at a speed equal to the speed of movement of the hand 9.

Thereafter, the hand 9 is moved downwardly until the lower pawls 45 come near the top of the drum 11. Then, the piston rod 64 of the vertical cylinder 63 is further pushed out so that the central portion 3e of the front end portion of the belt-shaped material 3 is pushed against the drum 11. In this operation, the two edge portions of the belt-shaped material 3 may be pushed against the drum 11. However, it is unnecessary to do so at the present step because the belt-shaped material 3 is trapezoidal in section as shown in FIG. 2.

Under the condition that the belt-shaped material 3 is kept pushed against the drum 11 by the depressing member 66, the piston rods 50 of the vertical pawl cylinders 49 are retracted to lift the upper pawls 52, while the piston rods 44 of the horizontal pawls cylinders 41 are also retracted to move the lower pawls 45 apart from each other, so that the contact area of the lower pawls 45 and the belt-shaped material 3 is decreased.

After the belt-shaped material 3 is released from the depressing member 66, the piston rod 64 of the vertical cylinder 63 is retracted to lift the depressing member 66. Under this condition, the hand 9 is moved to a predetermined horizontal position where the belt-shaped material 3 is not adversely affected when wound on the drum by both the building drum 11 and the conveying mechanism 1.

Under this condition, the drum 11 is rotated. Therefore, the belt-shaped material 3 on the conveying mechanism 1 is taken up by the drum while the two edge portions are being supported by the lower pawls 45 from below. That is, the belt-shaped material 3 is wound on the drum 11. In this operation, the belt-shaped material 3 is fed to the drum 11 while being centered because the centering rollers 85 are kept in rolling contact with the two edge portions of the belt-shaped material 3. When the belt-shaped material 3 is wound on the drum to a predetermined length, the rotation of the drum is suspended. Thereafter, the hand 9 is moved towards the conveying mechanism 1. However, the hand 9 is stopped when the rear end sensor 80 detects the rear end 3b of the belt-shaped material 3. Under this condition, the piston rods 44 of the horizontal cylinders 41 are pushed out to insert the lower pawls 45 deep under the two edge portions 3c and 3d of the belt-shaped material 3 so that the belt-shaped material 3 can be later pulled or compressed (as described later). Next, the hand 9 is lifted to raise the rear end of the belt-shaped material 3 with the lower pawls 45. Thereafter, the piston rods 50 of the vertical pawl cylinders 49 are pushed outwardly so that the upper pawls 52 approach near the respective lower pawls 45. As a result, the two edge portions 3c and 3d of the belt-shaped material 3 are respectively clamped by the two pairs of upper and lower pawls 52 and 45. Thereafter, the piston rod 64 of the vertical depressor cylinder 63 is pushed outwardly so that the depressing member 66 is abutted against the belt-shaped material 3 and the central portion 3e of the belt-shaped material 3 is sucked and retained by the depressing member 66.

Under this condition, the drum 11 is rotated so that the remainder of the belt-shaped material 3 is wound on the drum 11. In this operation, the hand 9 is moved towards the top of the drum while holding the rear end of the belt-shaped material 3. However, if, in this case, the remaining part of the belt-shaped material 3 is short, it is necessary to make the speed of movement of the hand 9 slightly lower than the peripheral speed of the drum 11 so that the belt shaped material is relatively pulled. On the other hand, if it is long, then it is necessary to make the speed of movement of the hand 9 slightly higher than the peripheral speed of the drum 11 so that the belt-shaped material is relatively compressed to allow the front end 3a and the rear end 3b of the belt-shaped material 3 to exactly butt against each other.

When the drum 11 is stopped after making one revolution, the hand 9 is moved downwardly until the pawls 45 come extremely near the drum 11. Thereafter, the piston rod 64 of the vertical cylinder 63 is further pushed out so that the central portion 3e of the rear end portion of the belt-shaped material 3 is pressed against the drum 11 by the depressing member 66. After the sucking and retaining of the belt-shaped material 3 by the depressing member 66 is suspended, the piston rod 64 of the vertical depressor cylinder 63 is retracted to lift the depressing member 66. Thereafter, the piston rod 73 of the pin cylinder 72 is pushed outwardly to swing the vertical depressor cylinder 63 about the pins 62 towards the conveying mechanism 1. This swing is stopped when the depressing member 66 is located directly above the junction of the belt-shaped material 3, i.e., the front and rear ends 3a and 3b. Under this condition, the vertical depressor cylinder 63 is operated so that the depressing member 66 is moved downwardly to press the junction of the belt-shaped material 3 and is then moved upwardly. After the piston rods 50 of the cylinders 49 are retracted to lift the upper pawls 52, the motors 23 are operated so that the two pairs of upper and lower pawls 52 and 45 are moved away from each other while the hand 9 is moved towards the conveying mechanism 1. The movement is ended when the lower pawls 45 touch only the two edge portions of the rear end portion 3b of the belt-shaped material 3.

Under this condition, the piston rods 50 of the vertical pawl cylinders 49 are pushed out so that the two edge portions of the rear end portion 3b of the belt-shaped material 3 are clamped by the upper and lower pawls 52 and 45. In this operation, the piston rod 64 of the vertical depressor cylinder 63 is retracted to lift the depressing member 66. Next, the motors (not shown) are driven to turn the gears 37 so that the pairs of upper and lower pawls 52 and 45 are swung, for instance, 35° to 45° about the axes of the horizontal pawl cylinders 41 towards the conveying mechanism 1. As a result, only the two edge portions of the rear end portion 3b of the belt-shaped material 3 are longitudinally elongated so that the "short-side" is eliminated. As the central portion 3e (in the widthwise direction) of the belt-shaped material is held by being pressed against the drum 11 in this manner, only the two edge portions thereof can be elongated. If the amount of elongation deviates from the value predetermined according to the kind of the belt-shaped material 3, it can be adjusted by moving the hand 9 forwardly or backwardly. In the above-described swinging operation, the lower pawls 45 may touch the surface of the drum 11. In this case, the hand 9 should be raised while the upper and lower pawls are being swung.

Thereafter, the hand 9 is moved downwardly. As was described before, the upper pawls 52 are larger in width than the lower pawls 45. Therefore, the corner portions of the belt-shaped material 3 are pushed against the drum 11 by the edges (on the side of the robot) of the upper pawls 52. When, under this condition, the piston rods 44 of the horizontal pawl cylinders 41 are retracted, the lower pawls 45 are disengaged from the corner portions of the belt-shaped material 3. Next, while the motors are operated to rotate the gears 37 to set the upper pawls 52 horizontal, the hand 9 is moved towards the conveying mechanism 1 so that the corner portions of the belt-shaped material 3 are pushed against the drum 11 by the upper pawls 52 while being slightly pulled. Since the two edge portions thus elongated are pressed against the drum with the upper pawls 52 without releasing the elongated part of the belt-shaped material 3, the enlongated part will not contract during the pressing operation. Thus, no gap is formed between the front and rear ends 3a and 3b of the belt-shaped material, and the front and rear ends 3a and 3b are not overlapped; that is, the front and the rear ends 3a and 3b are uniformly and positively butt-joined, so that the aimed cylindrical tire forming member is built.

Thereafter, the upper pawls 52 and the lower pawls 45 are returned to their initial positions by the operations of the motors 23, the cylinders 41 and 49 and the robot 5. Thus, one cycle of operation of the embodiment of the invention has been accomplished. Thereafter, the above-described operation is repeatedly carried out to build the cylindrical tire building members.

In the above-described embodiment, the upper pawls 52 and the lower pawls 45 are moved towards or away from each other by moving the upper pawls 52 vertically. However, the apparatus may be so modified that the upper pawls 52 and the lower pawls 45 are moved towards or away from each other by moving the lower pawls 45 vertically or by moving both the upper and lower pawls.

Furthermore, the apparatus may be so modified that the "short-side" is eliminated by elongating the two edge portions of the front end portion 3a of the belt-shaped material 3. In this case, when the central portion 3e of the front end portion of the belt shaped material 3 is pressed against the drum 1, the lower and upper pawls 52 and 45 are swung towards the robot 5 to elongate the two edge portions of the front end portion of the belt-shaped material 3.

In addition, the apparatus may be so modified that the front end portion of the belt-shaped material is sent to the drum while being held with suitable means such as a servicer and is then pressed against the drum with a depressing roll.

Moreover, the apparatus may be so modified that, when the belt-shaped material is fed to the drum, the belt-shaped material is centered with centering rollers set in the servicer which are brought into contact with both edges of the belt-shaped material.

As is apparent from the above description, in forming the cylindrical tire forming member, the front and rear ends of the belt-shaped material are butt-joined without forming a gap therebetween and without being overlapped.

What is claimed is:

1. An apparatus for building a cylindrical tire forming member, comprising:
   a building drum;
   a robot positioned in juxtaposition to said building drum and having a hand which is movable at least in a plane perpendicular to an axis of rotation of said building drum;
   a pair of lower pawls coupled to said robot hand body so that said lower pawls are movable towards and away from each other;
   a pair of upper pawls coupled to said robot hand body so that said upper pawls are paired with said lower pawls, respectively, said upper pawls being movable towards and away from the lower pawls to clamp together with the upper pawls opposite edge portions in a widthwise direction of a belt-shaped material;
   rocking means for rocking said upper and lower pawls paired as units in said plane; and
   a depressing member operatively coupled to said robot hand body, positioned between said pair of upper pawls and being movable in the direction of the thickness of said belt-shaped material to forceably apply the belt-shaped material interiorly of said edge portions against the periphery of said drum.

2. The apparatus as claimed in claim 1, wherein said robot comprises a vertical post, a robot body mounted for vertical movement on said post, an arm supported by said body and movable in a horizontal direction.

3. The apparatus as claimed in claim 1, wherein the drum is mounted for rotation about a vertical axis perpendicular to the direction of movement of the arm, wherein said hand is positioned above said drum, said hand body extends horizontally, and wherein said hand includes auxiliary plates fixed to respective lateral ends of the hand body, a pair of vertical central plates are fixed to said hand body intermediate of said auxiliary plates, a pair of threaded shafts threaded in opposite directions are rotatably supported by bearings within said central plates and said auxiliary plates, rails are fixedly secured to the lower surface of the hand body with said rails extending parallel to said threaded shafts, guide blocks are slidably engaged, respectively with said pair of rails and said guide blocks engage threaded blocks receiving said threaded shafts, electric motors are mounted at opposite ends of said hand body, and pulley and belt means couple said electric motors and said threaded shafts for rotating said shafts bidirectionally in response to energization of said electric motors, such that the threaded blocks are equidistantly displaced towards or away from each other in response to motor operation, and wherein said upper and lower pawls are operatively coupled to said guide blocks to move said pairs of pawls towards and away from each other tending to elongate the belt-shaped material in the widthwise direction of the material.

4. The apparatus as claimed in claim 3, wherein a movable unit is fixedly secured to each of said threaded blocks and includes a speed reducing device, said speed reducing device having an output shaft, a low speed output gear being fixedly mounted to the output shaft, said movable unit further including cylinders substantially parallel with the threaded shafts and rotatably supported through a bearing, a driven gear member fixedly mounted on the side of a piston rod of each cylinder and engageable with a low speed output gear, the lower pawls being respectively fixed to end portions of the piston rods of the cylinder with said lower pawls engaging the lower surfaces of both respective edge portions of the belt-shaped material, whereby, as the piston rods of the cylinders are moved in and out, the lower pawls are moved towards and away from each other in the widthwise direction of the belt-shaped material.

5. The apparatus as claimed in claim 4, wherein said rocking blocks are fixed to respective cylinders on the sides of the piston rods, and wherein said respective rocking blocks include vertical cylinders each having a projectable and retractable piston rod, said upper pawls are rotatably coupled to end portions of the piston rods of respective vertical cylinders, whereby the piston rods of the respective vertical cylinders are moved axially within the cylinders to move the upper pawls towards and away from the lower pawls so as to clamp the respective end portions of the belt-shaped material between the upper and lower pawls.

6. The apparatus as claimed in claim 5, further comprising a pair of brackets fixedly secured to the center of said hand body between said central plates, a vertical depressing member cylinder swingably mounted to said brackets over the periphery periphery of the building drum, said depressing member vertical cylinder having a piston rod projectable and retractable axially from the lower end of said depressing member vertical cylinder, said piston rod being pin connected to said depressing member, a passage way formed in the depressing member and communicating to a vacuum source, a number of openings formed in the lower face of the depressing member and communicating with the passage way for suction gripping of the belt-shaped material, whereby movement of the depressing member in the direction of the thickness of the belt-shaped material causes the central portion of the belt-shaped material to be applied under pressure against the building drum.

7. The apparatus as claimed in claim 6, further comprising an inverted U-shaped sensor mounting bracket fixed to the lower end of the depressing member vertical cylinder, a front end sensor and a rear end sensor fixedly mounted to opposite sides of the U-shaped sensor mounting bracket, whereby said front end sensor and said rear end sensor detects the presence of the front end and rear end of the belt-shaped material.

8. The apparatus as claimed in claim 7, further comprising centering rollers rotatably mounted, respectively to said rocking blocks for rolling contact with respective edge portions of said belt-shaped material to center the belt-shaped material laterally during conveyance of the belt-shaped material about the drum periphery.

* * * * *